No. 693,324. Patented Feb. 11, 1902.
A. W. JOHNSON.
POWER HAMMER.
(Application filed Apr. 30, 1900.)
(No Model.) 3 Sheets—Sheet 1.

Witnesses:
Howard A. Redfield.
Carlos Escobar.

Inventor:
Arthur W. Johnson
By his Attorney
Casper L. Redfield.

No. 693,324. Patented Feb. 11, 1902.
A. W. JOHNSON.
POWER HAMMER.
(Application filed Apr. 30, 1900.)
(No Model.) 3 Sheets—Sheet 3.

Witnesses:
Howard A. Redfield.
Carlos Escobar.

Inventor:
Arthur W. Johnson
By his Attorney
Casper L. Redfield.

THE NORRIS PETERS CO., PHOTO-LITHO., WASHINGTON, D. C.

UNITED STATES PATENT OFFICE.

ARTHUR W. JOHNSON, OF CHICAGO, ILLINOIS, ASSIGNOR TO LEOLA A. JOHNSON, OF CHICAGO, ILLINOIS.

POWER-HAMMER.

SPECIFICATION forming part of Letters Patent No. 693,324, dated February 11, 1902.

Application filed April 30, 1900. Serial No. 14,797. (No model.)

*To all whom it may concern:*

Be it known that I, ARTHUR W. JOHNSON, a citizen of the United States of America, and a resident of Chicago, county of Cook, and State of Illinois, have invented certain new and useful Improvements in Power-Hammers, of which the following is a specification.

My invention relates to power-hammers, and has for its object improvement in construction of such hammers, as will be hereinafter described.

Figure 1:
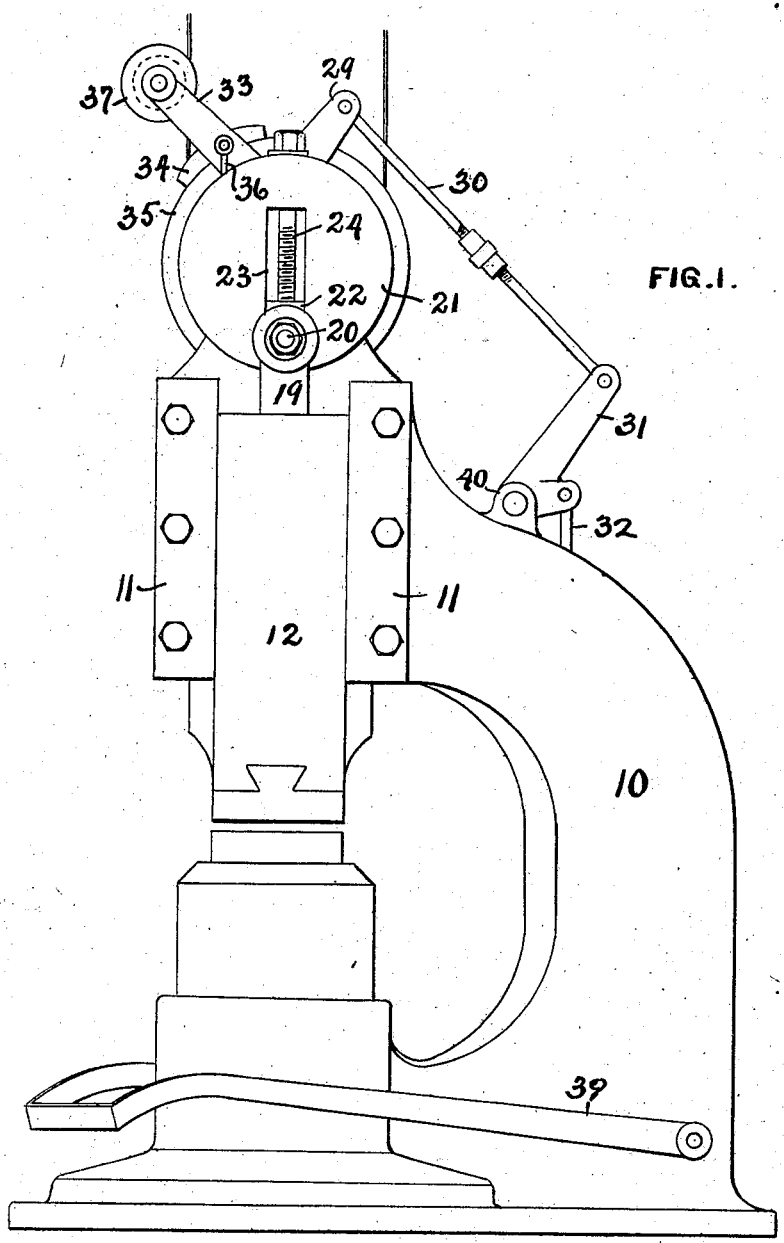
Figure 2:
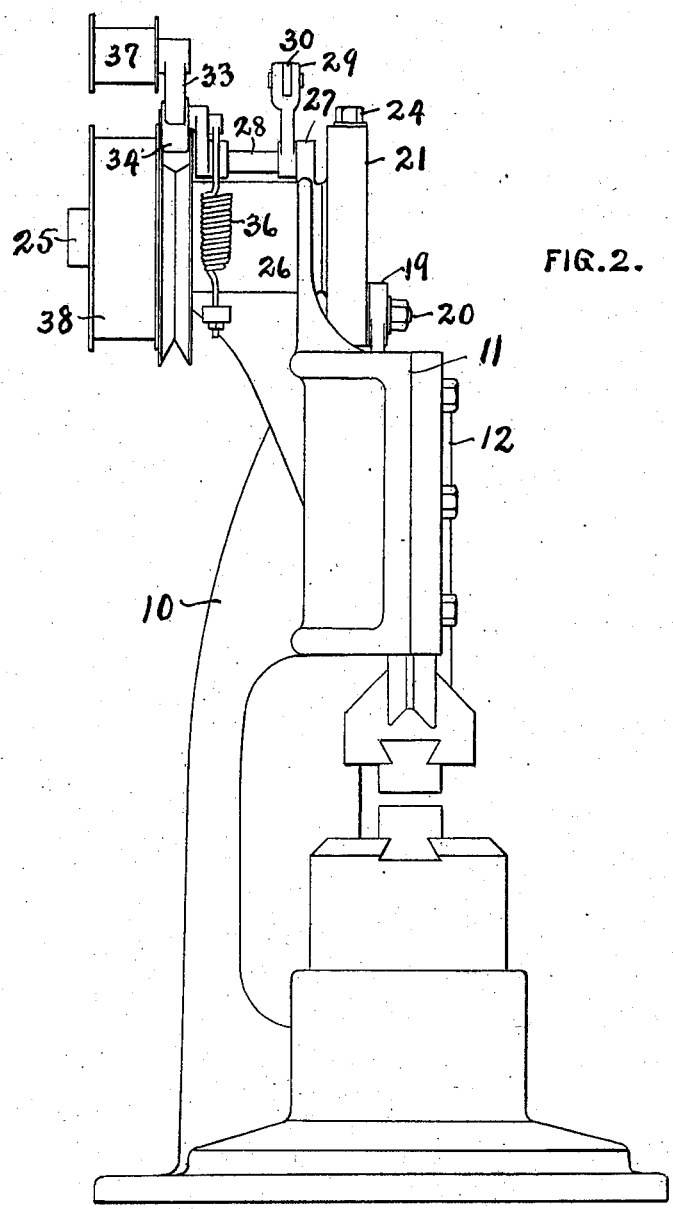
Figure 3:
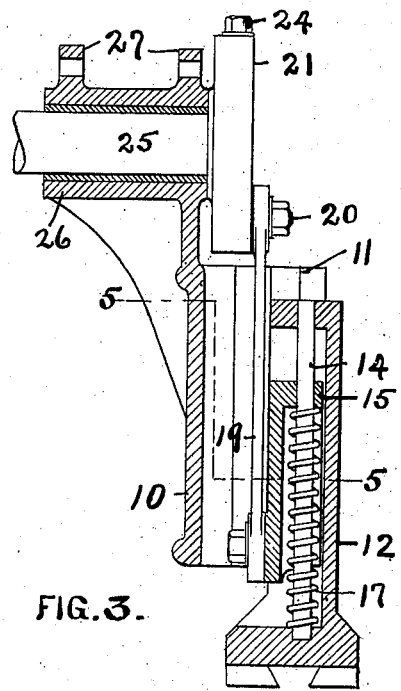
Figure 4:
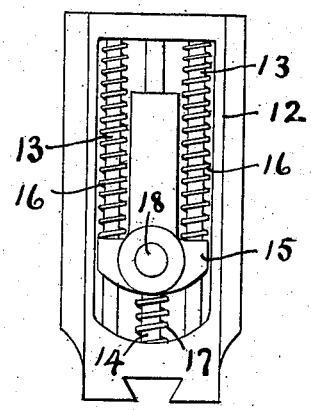
Figure 5:
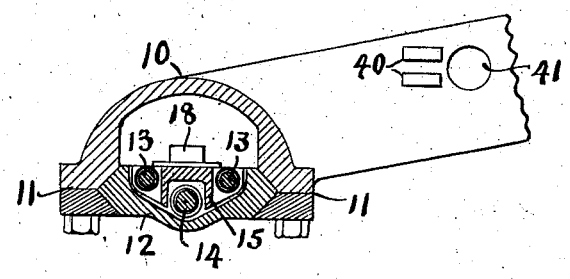

In the accompanying drawings, Figure 1 is a side elevation. Fig. 2 is a front elevation. Fig. 3 is a partial vertical section through the upper parts of the hammer. Fig. 4 is a rear or inside view of the ram, and Fig. 5 is a section on line 5 5 of Fig. 3.

In the said drawings, 10 represents a frame provided with vertical guides 11, in which there is movable a slide or cross-head 12, which acts as a ram. The slide 12 is chambered out on the inner side, and within this chamber there are three vertical parallel rods 13 and 14, upon which is mounted a second cross-head or slide 15, which has a shape like an inverted T. On the rods 13 are helical springs 16, and on the rod 14 is a helical spring 17. These springs are so arranged that the springs 16 resist an upward movement of the cross-head 15, while the springs 17 resist its downward movement. The spring 17 is made heavier than the springs 16, and preferably the one spring 17 is approximately equal to the two springs 16. On the cross-head 15 is a pin 18, which is connected by a connecting-rod 19 with a crank-pin 20, carried on the crank-disk 21. The pin 20 is not directly connected to the disk 21, but to a block 22, which is adjusted in a slide 23 by the screw 24. The disk 21 is solid with or secured to the shaft 25, which is driven by a pulley 38. It will be apparent that by rotating the disk 21 the movement of the pin 20 will cause the slide 15 to reciprocate vertically, which reciprocation is transmitted to the ram 12 through the springs 16 and 17. By compression of these springs at the ends of the strokes, which compression is due to inertia of the ram 12, the actual stroke of the ram is or may be considerably greater than the actual stroke of the slide 15. There is therefore a clearance between the upper and lower ends of the slide 15 and the ends of the chamber in the ram 12. The slide 15 therefore reciprocates on the rods 13 and 14.

On the top of the bearing 26 on the frame 10 are two lugs 27, in which there is a shaft 28. On the shaft 28 is an arm 29, which is connected by a link 30 to an arm 31, pivoted in the lugs 40 on the frame 10. From a branch of the arm 31 a link 32 extends downward through the opening 41 and the inside of the frame 10 to connect in the interior to a treadle-lever 39. Also on the shaft 28 is an arm 33, which has a shoe 34, that fits into a V-shaped groove of a brake-wheel 35. The spring 36, united to the arm 33, serves to keep the shoe 34 in contact with the brake-wheel 35, so as to stop the movement of the press. Also on the arm 33 is a tightening-pulley 37 for engaging the belt to drive the pulley 38. It will be evident from examination of the drawings that by placing the foot upon the treadle 39 the connections 32, 31, 30, 29, 28, and 34 will release the brake on the brake-wheel 35, when the same parts and the pulley 37 will tighten the belt running on the pulley 38, so as to cause the hammer to operate.

Referring again to the slides 12 and 15, it will be apparent that the construction is one slide mounted upon guides supported by a second slide, which in turn is guided by a frame. It will be seen by the construction of the slide 15 that long springs 16 and 17 are obtained without making the slide or ram 12 extraordinarily long. This is accomplished on one side by making the slide 15 T-shaped and on the other side by chambering out the back or the inner part of the stem of the T. The frame is also made short as a consequence of having the pin 18 located at or near the head of the T rather than at or near the middle of its length.

What I claim is—

1. The combination with a hammer-frame provided with vertical guides, of a ram arranged to slide in said guides and provided with an interior chamber, three parallel rods supported by said ram within said chamber and arranged so that they form the three corners of a triangle, a cross-head mounted upon said rods and arranged so that one end of said cross-head is guided by two of said rods and the opposite end by the third rod, and springs mounted upon said rods and interposed between the guided ends of said cross-head and the more remote ends of said chamber, substantially as described.

2. The combination with a hammer-frame provided with vertical guides and a chamber in the rear of said guides, a crank mounted upon said frame over said guides, and a connecting-rod extending from said crank to the interior of said chamber, of a ram arranged to slide in said guides and provided with a longitudinal chamber adjacent to the chamber in said frame, three parallel rods supported within the chamber of said ram and arranged in the form of a triangle, a cross-head mounted upon said rods and arranged so that one end of said cross-head is guided on two of said rods and the opposite end upon the third rod, springs mounted upon said rods and interposed between the guided parts of said cross-head and the more remote ends of the chamber within said ram, and a pin extending from the rear face of said cross-head into the chamber within said frame whereby said cross-head is operated by said crank and said connecting-rod.

3. In a power-hammer, the combination with a ram provided with a longitudinal chamber, longitudinal guides within said chamber, a longitudinal cross-head within said guides and arranged to be guided by said guides at its two ends, and springs inserted between the guided ends of said cross-head and the remote ends of the chamber whereby the said springs overlap and pass each other substantially as described, of a crank and a connecting-rod for operating said cross-head, and means for adjusting the length of the crank whereby the stroke of said cross-head may be varied.

Signed at Chicago, Illinois, this 26th day of April, 1900.

ARTHUR W. JOHNSON.

Witnesses:
R. E. SMALE,
C. L. REDFIELD.